Sept. 17, 1935.  M. F. CARR  2,015,049
SEPARABLE SNAP FASTENER SOCKET AND INSTALLATION THEREOF
Filed Jan. 12, 1933
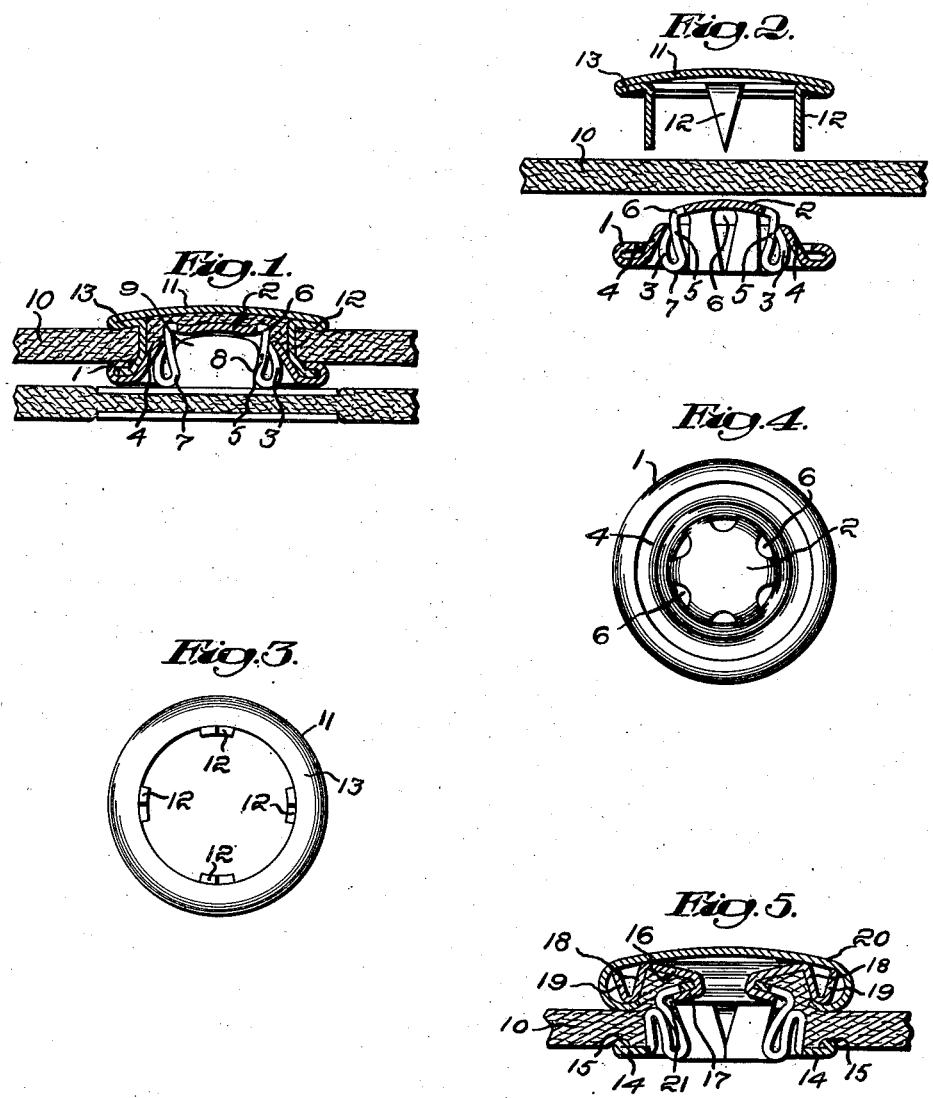
Inventor:
Moses F. Carr,
by Emery, Booth, Varney & Townsend
Attys Patented Sept. 17, 1935

2,015,049

UNITED STATES PATENT OFFICE 2,015,049

SEPARABLE SNAP FASTENER SOCKET AND INSTALLATION THEREOF

Moses F. Carr, Lincoln, Mass., assignor to United-Carr Fastener Corporation, Cambridge, Mass., a corporation of Massachusetts Application January 12, 1933, Serial No. 651,294

3 Claims. (Cl. 24—216)

My invention aims to provide improvements in separable snap fastener sockets and installations thereof.

In the drawing which illustrates a preferred embodiment of my invention:—

Figure 1 is a cross-sectional view showing one preferred form of socket and socket installation and a cooperating stud, the stud being shown in elevation;

Fig. 2 is a section through the parts of the socket installation shown in Figure 1 prior to assembly thereof;

Fig. 3 is an under side plan view of the socket-attaching member;

Fig. 4 is a plan view of the stud-receiving part of the socket; and

Fig. 5 is a section through a modified form of socket installation.

Referring to the embodiment of my invention illustrated by Figs. 1 through 4 I have shown a one-piece socket member (Figs. 2 and 4) formed from sheet metal and having a support-engaging flange portion 1 of substantially U-shaped cross-section. The central portion is pressed out to form a stud-receiving boss 2 closed at its upper end and open at its lower end to provide a stud-receiving aperture. The boss portion 2 is connected to the support-engaging flange portion 1 by walls 3 and 4 concentric with and substantially parallel to the wall 5 of the boss 2. The socket is preferably of the yieldable type and therefore I have divided the walls 3 and 5 by slits 6 to permit yielding of those walls. The wall 5 tapers inwardly toward the stud-receiving aperture 3 and is connected to the wall 3 by a smoothly rounded portion 7 adapted to engage the neck 8 of a cooperating stud 9, as best shown in Figure 1.

The wall 3 is preferably spaced from the wall 5 except adjacent to where it connects with the walls 4 so that there may be independent yielding of the walls 3 and 5 during engagement with or disengagement from the stud 9. The wall 4 preferably tapers outwardly away from the wall 3 from its point of engagement therewith so as to be spaced therefrom to permit movement of the wall 3 toward the wall 4 during yielding movement.

In the particular embodiment of my invention illustrated in Figure 1, the socket is secured to a carrying medium or support 10 by the cooperation of an attaching plate 11 carrying prongs 12 and the wall 4 and U-shaped flange portion 1. The prongs 12 carried by the attaching plate extend at right angles to the general plane of the plate 11 so that they may pass through the socket support 10 and engage the U-shaped flange portion 1. The prongs 12 preferably extend from the inner edge of an inwardly bent flange 13 so that they are spaced a substantial distance inwardly from the plate 11. Therefore, the prongs after passing through the support 10 come into contact with the sloping surface of the wall 4 and are thereby turned outwardly and upset between the walls of the U-shaped flange portion 1, as best illustrated in Figure 1. With this type of attaching means it is unnecessary previously to form apertures in the carrying medium or support 10 because the prongs are sharp pointed (Figs. 2 and 3) and therefore pierce their own ways through the carrying medium. As a result, the support 10 is gripped tightly between the attaching plate and the socket so that a very neat and durable attachment is provided.

The arrangement of the walls 3, 4 and 5 with respect to each other and with respect to the flange portion 1 is such that after the socket is securely attached to the carrying medium or support 10 the yieldable walls 3 and 5 are protected against accidental distortion when the fastener is in use and when it is passed between the rolls of a wringer or the like during the laundering process of a garment to which the socket may be applied. Furthermore, the wall 4 back-supports both the wall 3 and the wall 5 to prevent overexpansion and setting thereof.

Referring now to the modified form of my invention illustrated in Fig. 5, I have shown a socket member which is formed in substantially the same manner as that described in connection with Figs. 1 through 4. In this particular structure, however, I have shown a support-engaging flange 14 which is flat with the exception of the rolled edge 15 because the socket is attached by a rivet rather than by attaching prongs. Therefore, with a rivet attachment it is unnecessary to provide the U-shaped clenching means provided on the first described form.

The means of attachment is different in the device shown in Fig. 5 and comprises a part 16 having a tubular rivet portion 17 extending centrally therefrom. The part 16 is provided with walls 18 and 19 adjacent to the periphery thereby leaving a space to receive the carrying medium or support 10 and a portion of the boss 2. The part 16 is preferably concealed by a cap member 20 secured thereto by rolling the edge underneath the walls 18 and 19. The tubular rivet 17 may be of the self-piercing type so that when the attaching member and the socket are moved toward each other on opposite sides of the support 10 the rivet will pierce its own way through the carrying medium and enter an aperture 21 formed in the top of the boss portion 2. Thereafter the end of the rivet 17 is upset, as shown in Fig. 5, and the support 10 is gripped tightly between the cap 20 and flange 14.

The concentric walls of the socket shown in Fig. 5 are the same in general so far as the walls 3 and 5 are concerned. However, since it is unnecessary to have the wall 4 imperforate and act as an anvil means, I have carried the slits 7 through the wall 4 to increase to some extent the over-all resiliency of the walls. Since the slits 7 terminate in the flange 14, I have rolled the periphery of the flange 14 back upon itself to provide a stiffened edge 15 thereby strengthening the flange to such an extent that it is unlikely that the flange will crack or split adjacent to the ends of the slits 7 terminating in the flange 14.

While I have illustrated and described preferred embodiments of my invention, I do not wish to be limited thereby, because the scope of my invention is best defined by the following claims.

I claim:

1. A snap fastener socket formed from sheet metal and having a support-engaging flange portion adjacent to the periphery, a central stud-receiving boss surrounding a stud-receiving aperture, said boss being located substantially entirely at one side of the plane of said support-engaging flange portion and a plurality of annularly arranged walls connecting said boss and flange portions, and said boss and at least one of said annular walls being split to permit expansion and contraction of said boss adjacent to the stud-receiving aperture.

2. A snap fastener socket formed from sheet metal and having a central hollow boss surrounding a stud-receiving aperture, a pair of annular walls surrounding said boss, at least one of said walls and said boss being divided by a series of radial cuts to permit expansion and contraction of said boss for enlargement of the stud-receiving aperture, and a support-engaging flange located outside of said walls and substantially in the plane of the stud-receiving aperture.

3. A snap fastener socket formed from sheet metal and having a central hollow boss portion surrounding a stud-receiving aperture, a pair of annular walls surrounding said boss, said boss and the wall nearest thereto being divided by slits to permit yielding movement thereof for enlargement of the stud-receiving aperture at one end of said boss, the other wall being imperforate and a support-engaging flange extending from said imperforate wall in substantially the same plane as the stud-receiving aperture.

4. A snap fastener socket formed from sheet metal and having a central hollow boss surrounding a stud-receiving aperture, a pair of annular walls surrounding said boss, said boss and the wall nearest thereto being divided by slits to permit yielding movement thereof for enlargement of a stud-receiving aperture at one end of said boss, the other wall being imperforate and a support-engaging flange extending from said imperforate wall in substantially the same plane as the stud-receiving aperture, said support-engaging flange being substantially U-shaped in cross-section and said imperforate wall flaring outwardly toward said flange thereby to provide an anvil means for directing and upsetting attaching prongs of an attaching plate into engagement with said support-engaging flange.

5. A snap fastener socket installation comprising, in combination, an attaching member having prongs extending therefrom, a carrying medium and a snap fastener socket member, said snap fastener socket member and said attaching member being located on opposite sides of the carrying medium, said socket member having a central boss provided with a stud-receiving aperture at one end thereof, a pair of annular walls surrounding said boss, at least one of said walls and said boss being divided by a series of radial slits to permit expansion and contraction thereof for enlargement of the stud-receiving aperture, a support-engaging flange of substantially U-shaped cross-section connected to the outermost wall in substantially the plane of the stud-receiving aperture, said outermost wall flaring outwardly toward said flange and said attaching prongs extending through the carrying medium and bent outwardly into the space provided by said U-shaped flange thereby to secure the parts of the installation together.

6. A snap fastener socket installation comprising, in combination, an attaching member having a riveting shank extending therefrom, a carrying medium and a snap fastener socket member, said snap fastener socket member and said attaching member being located on opposite sides of the carrying medium, said socket member having a central boss provided with a stud-receiving aperture at one end thereof and a rivet-receiving aperture at the other end thereof, a pair of annular walls surrounding said boss, at least one of said walls and said boss being divided by a series of radial slits to permit contraction and expansion thereof adjacent to the stud-receiving aperture, a support-engaging flange connected to the outermost wall in substantially the plane of the stud-receiving aperture to provide means for cooperation with the attaching member for clamping the carrying medium adjacent to the periphery of the attaching member and of the socket member, and said riveting shank passing through the rivet-receiving aperture in said boss and having its end upset and securing the parts of the installation together.

7. A snap fastener socket formed from a single piece of sheet metal and having a central boss provided with a stud-receiving aperture at one end thereof, a pair of annular walls surrounding said boss, a support-engaging flange portion extending outwardly from the outermost wall in substantially the same plane as the stud-receiving aperture, said pair of annular walls and boss being divided by a plurality of slits to permit yielding movement thereof laterally for enlargement of the stud-receiving aperture and means provided as a part of the socket for cooperation with suitable attaching means whereby the socket may be secured to a supporting structure.

8. A snap fastener socket formed from a single piece of sheet metal and having a central boss provided with a stud-receiving aperture at one end thereof, a pair of annular walls surrounding said boss, a support-engaging flange portion extending outwardly from the outermost wall in substantially the same plane as the stud-receiving aperture, said pair of annular walls and boss being divided by a plurality of slits to permit yielding movement thereof laterally for enlargement of the stud-receiving aperture, means provided as a part of the socket for cooperation with suitable attaching means whereby the socket may be secured to a supporting structure and a rolled edge at the periphery of said flange to strengthen the same against accidental cracking adjacent to the slits in said walls.

MOSES F. CARR.